United States Patent
Tong et al.

(10) Patent No.: US 6,346,755 B1
(45) Date of Patent: Feb. 12, 2002

(54) OPTIMIZATION OF VENTILATING FLOW PATH AT AIR GAP EXIT IN REVERSE FLOW GENERATORS

(75) Inventors: Wei Tong, Clifton Park; Christian Lee Vandervort, Voorheesville, both of NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/607,911

(22) Filed: Jun. 30, 2000

(51) Int. Cl.[7] .............................. H02K 1/12; H02K 9/00
(52) U.S. Cl. ........................ 310/58; 310/52; 310/216; 310/254; 310/259
(58) Field of Search .................. 310/58, 59, 61, 310/259, 260, 216, 217, 52, 258, 254

(56) References Cited

U.S. PATENT DOCUMENTS

| | | | | |
|---|---|---|---|---|
| 1,689,188 A | * | 10/1928 | Pohl et al. ................ 310/256 |
| 2,795,714 A | * | 6/1957 | Baudry ...................... 310/256 |
| 3,100,271 A | * | 8/1963 | Darrieus et al. .......... 310/256 |
| 3,324,324 A | | 6/1967 | Richardson et al. ....... 310/214 |
| 4,100,439 A | * | 7/1978 | Boer et al. .................. 310/57 |
| 4,258,281 A | * | 3/1981 | Calfo et al. ................ 310/256 |
| 4,547,688 A | | 10/1985 | Hammer et al. ............. 310/59 |
| 4,638,199 A | * | 1/1987 | Brem et al. ................. 310/91 |
| 5,113,114 A | | 5/1992 | Shih et al. ................. 310/270 |
| 5,174,011 A | | 12/1992 | Weigelt ...................... 310/598 |
| 5,358,432 A | | 10/1994 | Shih et al. ................. 439/825 |
| 5,861,698 A | | 1/1999 | Murphy ...................... 310/214 |

FOREIGN PATENT DOCUMENTS

DE     1 141 021     12/1962

* cited by examiner

Primary Examiner—Burton S. Mullins
(74) Attorney, Agent, or Firm—Nixon & Vanderhye P.C.

(57) ABSTRACT

A rotor assembly including a rotor body and a stator, the rotor body having field coils seated within radial slots formed in the rotor body with end turns of the coils extending beyond opposite ends of the rotor body, and annular retaining rings fixed to the opposite ends of the rotor body and adapted to constrain the end turns against centrifugal forces, and wherein the stator includes a core with stator bars secured therein, the core having core-end tapers at opposite ends thereof that define, in combination with the retaining rings, annular ventilation air exit gaps; each the retaining ring comprising axially inboard and outboard ends, and wherein a radially outer surface at the axially inboard end has an aerodynamically smooth spline shape defined by compound radii that merges into a rounded nose portion, the core-end tapers of the stator core tapering in an axial and radially outward direction in a manner approximating a smooth curve.

13 Claims, 6 Drawing Sheets

OPTIMIZATION OF VENTILATING FLOW PATH AT AIR GAP EXIT IN REVERSE FLOW GENERATORS

BACKGROUND OF THE INVENTION

This invention relates to reverse flow generators and, specifically, to a redesign of the retaining ring and stator core-end taper to optimize the ventilating flow path between the rotor and stator at the annular air gap exit between them.

The reverse flow concept for generator cooling has been developed since the 1980s. The main advantage to using reverse flow is a characteristic high cooling efficiency, and an uprating capability of the rotor end turns. With the reverse flow configuration, the cooling gas flows directly from the coolers to the rotor without passing through a fan, and the cooling gas absorbs no heat other than a portion of the core losses in the yoke. Hence, it offers cooling gas at lower temperatures not possible from other known ventilation arrangements. However, reverse flow ventilation also results in a longer machine and somewhat greater complexity in the generator end region.

In a reverse flow generator, pressure losses occur at backward- and forward- facing steps, sharp turns, sudden contractions and expansions, and any torturous paths in the gap between the rotor and stator. Among these, a primary pressure drop appears at the annular air gap exit due to the sharp change in the flow area and torturous ventilating flow path. Specifically, in the air gap exit region, a "bottle neck" is formed between the retaining ring nose and the stator core-end taper. As cooling gas flows through this region, a significant acceleration of the flow causes a large local pressure drop that is only partially recovered downstream. To increase the effectiveness of generator ventilation systems, it is desirable to eliminate the "bottle neck."

In addition, the ventilating flowrate through the air gap exit in a reverse flow generator is about 60–80% of the total fan flowrate, much larger than that in a forward flow generator where only about 30% of the fan flowrate passes through the air gap entrance. Since the ventilation windage loss $WO_{loss}$ at the air gap exit is proportional to the product of the flow rate Q and the pressure drop $\Delta p$ across it, a small change in $\Delta p$ could result in a large change in $W_{loss}$ due to the high Q values.

Moreover, the conventional design of the air gap exit in reverse flow generators may create high drag forces against the ventilating flow when it passes through the gap exit, and thus lead to lower generator cooling efficiency.

BRIEF SUMMARY OF THE INVENTION

In accordance with the present invention, the ventilating flowpath at the air gap exit is redesigned to smooth the flowpath and to thereby minimize the ventilation windage loss through the air gap exit. Specifically, the rotor retaining ring is provided with a "spline" profile near its nose end and the nose end itself is rounded, to thereby improve the axial cooling flow fluidity and enhance cooling capability. This change alone eliminates much of the pressure drop across the air gap exit by increasing the net flow area and decreasing drag. This aspect of the air gap exit redesign is disclosed in our commonly owned co-pending application Ser. No. 09/551,591, filed Apr. 17, 2000, the entirety of which is incorporated herein by reference.

This re-design of the retaining ring is further combined with a re-design of the stator core-end taper to include a smoother profile that further reduces drag by smoothing the flowpath through the gap exit.

Accordingly, in its broader aspects, the invention relates to a stator core for a stator assembly, the core comprising of an annular body having a plurality of stator bars secured therein, and wherein axially opposite ends of the core are formed with a core-end that approximates a smooth curve.

In another aspect, the invention relates to a rotor assembly including a rotor body and a stator, the rotor body having field coils seated within radial slots formed in the rotor body with end turns of the coils extending beyond opposite ends of the rotor body, and annular retaining rings fixed to the opposite ends of the rotor body and adapted to constrain the end turns against centrifugal forces, and wherein the stator includes a core with stator bars secured therein, the core having core-end tapers at opposite ends thereof that define, in combination with the retaining rings, annular ventilation air exit gaps; each the retaining ring comprising axially inboard and outboard ends, and wherein a radially outer surface at the axially inboard end has an aerodynamically smooth spline shape defined by compound radii that merge into a rounded nose portion, the core-end tapers of the stator core tapering in an axial and radially outward direction in a manner approximating a smooth curve.

DETAILED DESCRIPTION OF THE INVENTION

Figure 1:
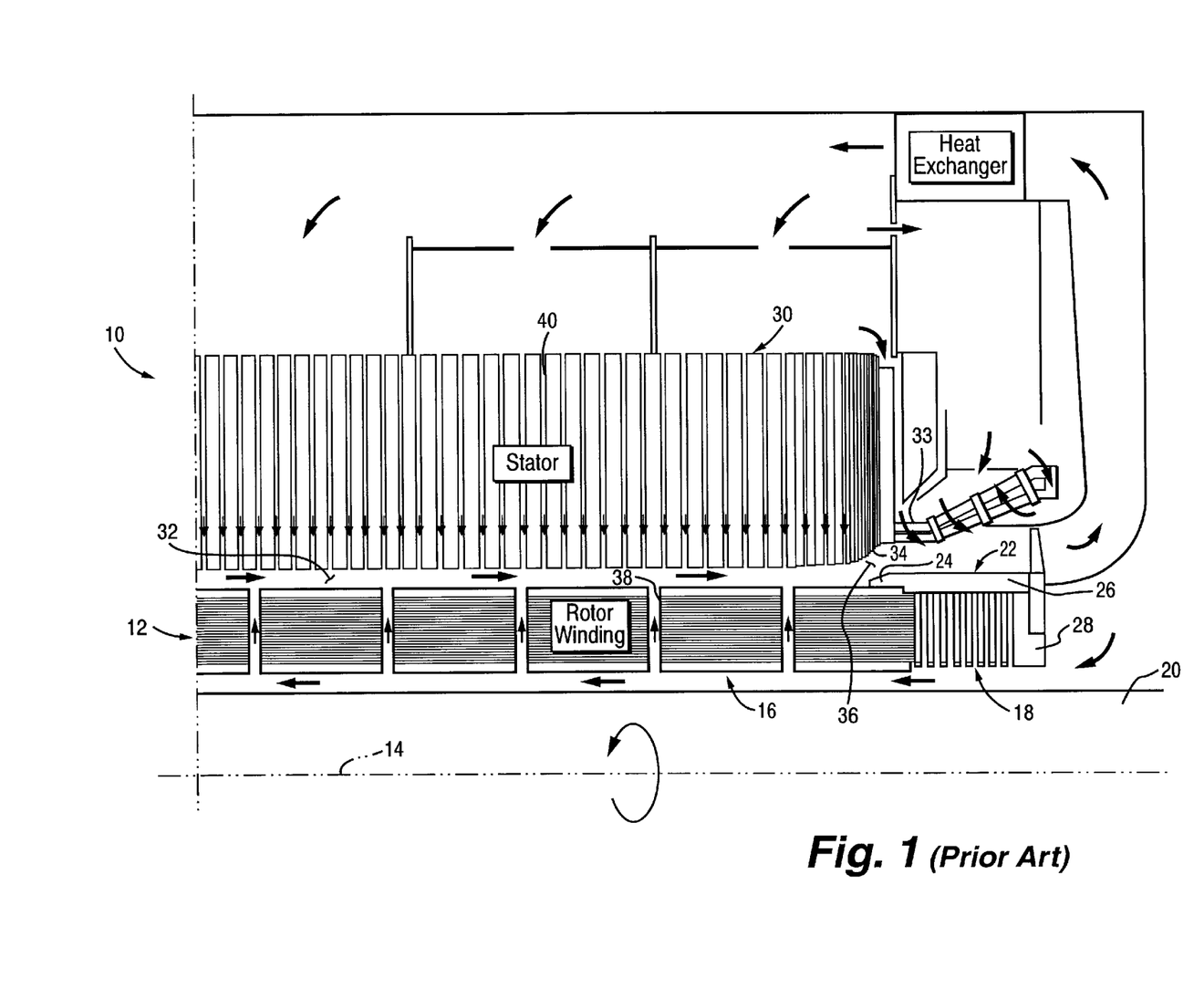
FIG. 1 is a schematic diagram of a ventilating flow distribution in a reverse flow generator.

With reference to FIG. 1, one end of a rotor/stator assembly in a reverse flow generator 10 includes a rotor body 12 rotatable about a longitudinal center axis 14. The rotor body includes a plurality of coils (one shown partially at 16) that are arranged in axially extending radial grooves formed in the rotor body 12. The coil end turns 18 extend beyond a part of the rotor body, where they turn and connect to opposite sides of the windings seated in other of the rotor grooves. A spindle portion 20 of the rotor body extends beyond the end turns, but radially inwardly thereof. The coils are supported in the slots of the rotor body against centrifugal forces by metal wedges (not shown) that bear against machined dovetail surfaces (not shown) in each rotor slot. The end turns 18 at opposite ends of the rotor are supported against centrifugal forces by high strength, annular retaining rings 22 (one shown). The inboard end 24 of the retaining ring is shrunk onto a machined surface of the rotor body, while an outboard end 26 is shrunk onto a circular shaped, steel centering ring 28.

The stator includes a core 30 that extends parallel to and in surrounding relationship with the rotor body with a radial gap 32 therebetween. The stator winding is a conventional lap wound design, with stator bars 33 secured in radial slots within the stator core. The stator core 30 is formed with a core-end taper 34 at the air gap exit 36, which is also proximate the inboard end 24 of the retaining ring.

FIG. 1 also illustrates ventilating or cooling flow distribution, the cooling air entering the rotor body and travelling axially therealong, with part of the cooling air caused to flow radially outwardly through axially spaced cooling slots or grooves 19 and then reversing direction to flow along the radial gap 32, and out through the air gap exit 36. At the same time, cooling air enters the stator core and flows radially inwardly through axially spaced cooling passages 40 (located between the radial slots) and then mixes with the rotor cooling air in the radial gap 32.

Figure 2:
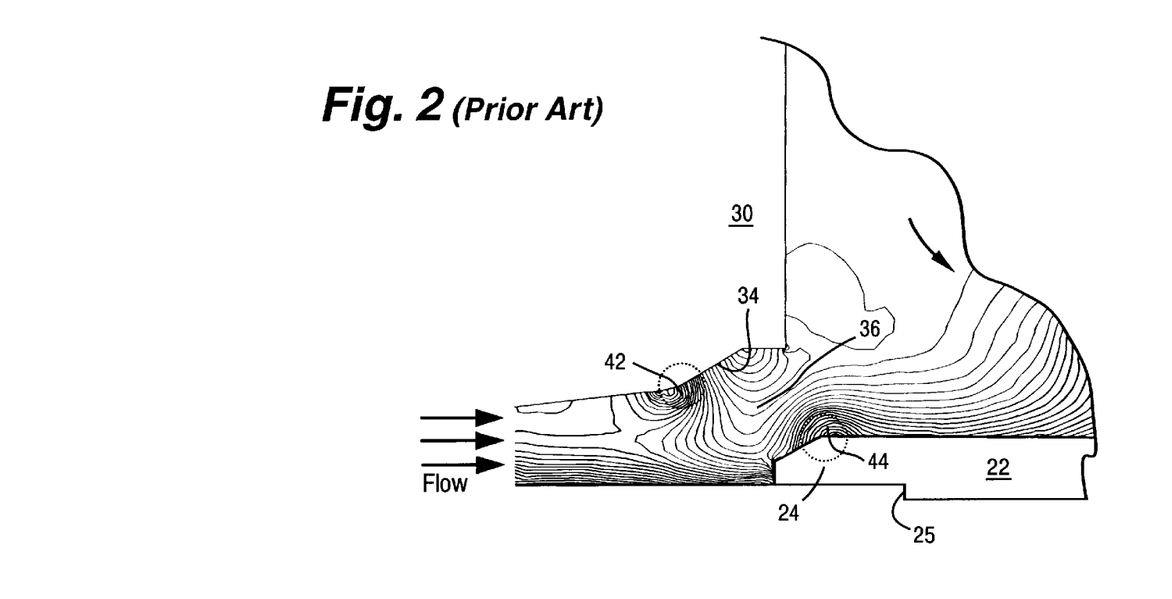
FIG. 2 is a partial static pressure distribution diagram at the end winding region of a reverse flow generator.

FIG. 2 displays a static pressure distribution in the conventional design of the air gap path for a reverse flow generator. It can be seen that the pressure concentration zones 42, 44 occur at the core-end taper 34 and the inboard end 24 of the retaining ring 22, respectively. It is thus apparent that a bottle neck is formed between the inboard end 24 of the retaining ring 22 and the core-end taper 34 of the stator core 30 at the stator-rotor gap exit 36. As cooling gas passes the stator-rotor entrance gap 36, it generates a large flow circulation at the retaining ring nose and, consequently, produces a large pressure drop. This pressure drop may be defined as $\Delta \bar{p} = \bar{p}_1 - \bar{p}_2$, where $\bar{p}_1$ is the pressure upstream of the core end taper 34, and $\bar{p}_2$ is the pressure downstream of the inboard end 24 (or downstream of the radial step 25) of the retaining ring 22.

A change in air gap exit geometry can strongly affect the velocity field and pressure distribution at the region. As already noted, the present invention relates to a redesign of the retaining ring 22 and stator core-end taper 34 to minimize the pressure drop across the air gap exit and drag force against the axial ventilating flow.

A comparison of the proposed retaining ring 46 (FIG. 3) with the conventional design (FIGS. 1 and 2) indicates three modifications of the new retaining ring design: 1) using a "spline" shape or profile 48 to replace the large bevel angle at the retaining ring inboard end 24; 2) rounding the nose end 50; and 3) reducing the overall thickness of the retaining ring about 10–15% while still satisfying the stress and fatigue requirements of the ring. The stress analysis has demonstrated that the change in the maximum stress is less than 3%. The combination of these three modifications enhances flow fluidity from both the smoothed flow path and the enlarged effective flow cross-sectional area.

Figure 3:
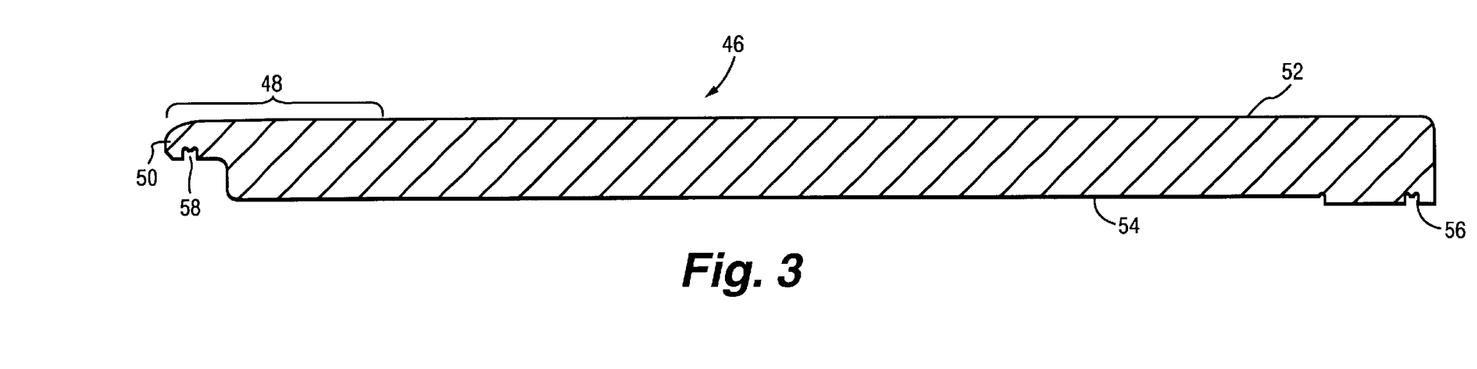
FIG. 3 is a side section illustrating a retaining ring in accordance with an exemplary embodiment of the invention.

With further reference to FIG. 3, the structural features of the retaining ring 46 are the same as in a conventional retaining ring in the axially outboard end 52 of the ring, as well as along the radially inner surface 54 incorporating the locking key grooves 56, 58. The spline profile at the axially inboard end portion is indicated at 48 in FIG. 3. Specifically, the radially outer profile at the inboard end is altered from a flat, cylindrical surface to an aerodynamically curved spline surface, with the curvature extending only about 17% of the total retaining ring length, as measured from the rounded nose 50. The curvature is defined by compound radii, designed to provide an aerodynamically smooth surface. More specifically, the spline shape of the outer surface of the retaining ring in the axially inboard portion 48 can be described by a function of the cubic curve $$y = \frac{x}{a + bx + cx^2}$$

where a, b, and c are constants. Basically, a determines the spline shape, b defines the maximum retaining ring outer diameter which the spline curve approaches, and c has a strong impact on the spline curve slope, i.e., how fast the spline curve approaches the retaining ring outer diameter. The general ranges of the constants are:

$0.2 \leq a \leq 5.0$ $1.5 \leq b \leq 2.5$ $-0.005 \leq c \leq 0$

Figure 4:
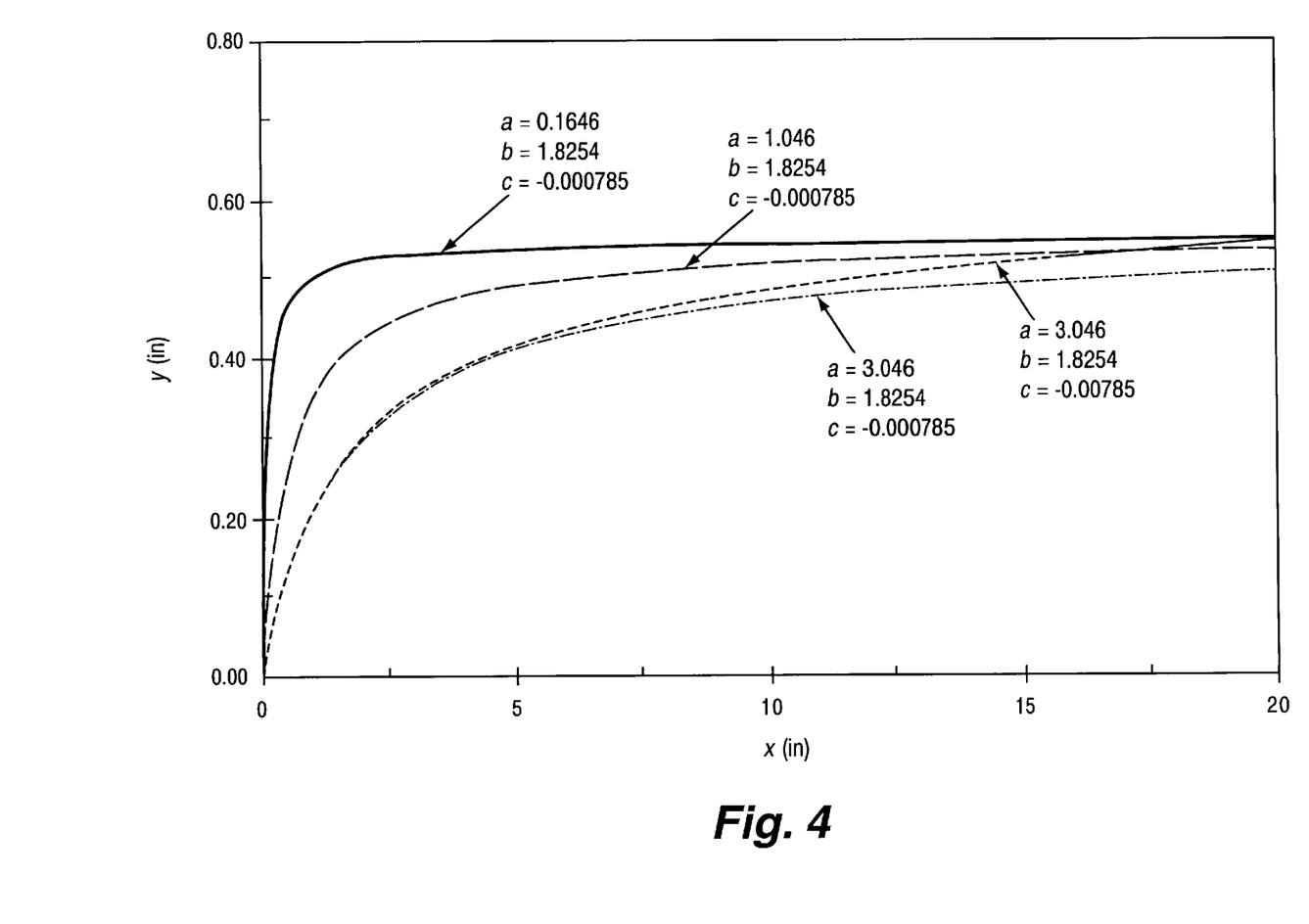
FIG. 4 is a plot of dimensions for various spline profiles in accordance with the invention.

Examples for defining spline profiles are shown in FIG. 4. For a specific generator, b is essentially fixed. It has been demonstrated in the figure that by keeping b and c fixed, the spline shape changes significantly with the a value. FIG. 4 also shows that the spline slope is inversely proportional to the c value. As c decreases, the curve slope becomes higher, indicating that the ratio of the spline length to the total retaining ring length becomes larger. An optimized spline profile can be determined by trading off these three constants so that the design requirements can be best satisfied.

Figure 5:
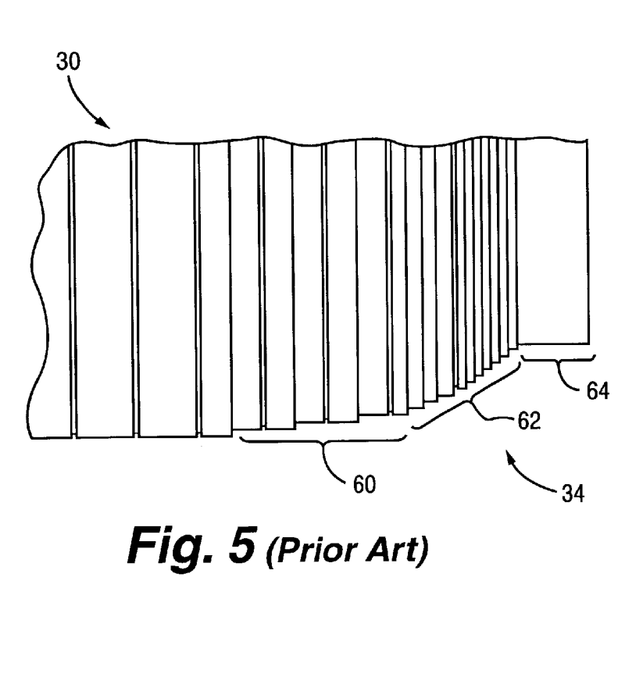
FIG. 5 is a partial side elevation of a known core end taper design.
Figure 6:
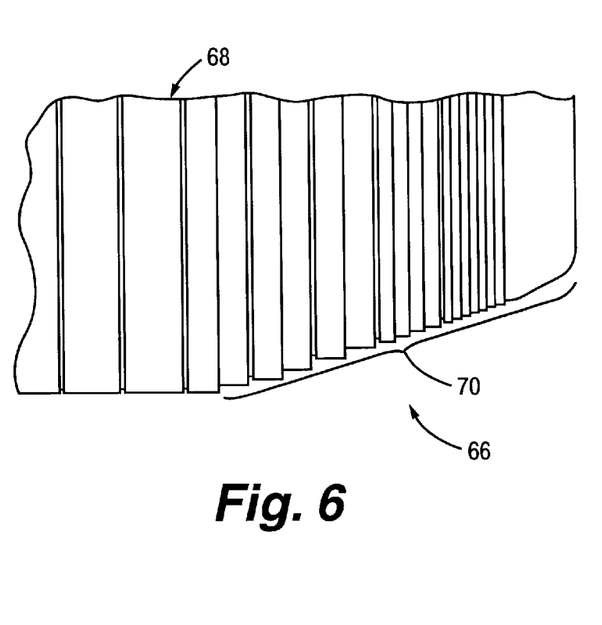
FIG. 6 is a partial side elevation of a core end taper design in accordance with the invention.
Figure 7:
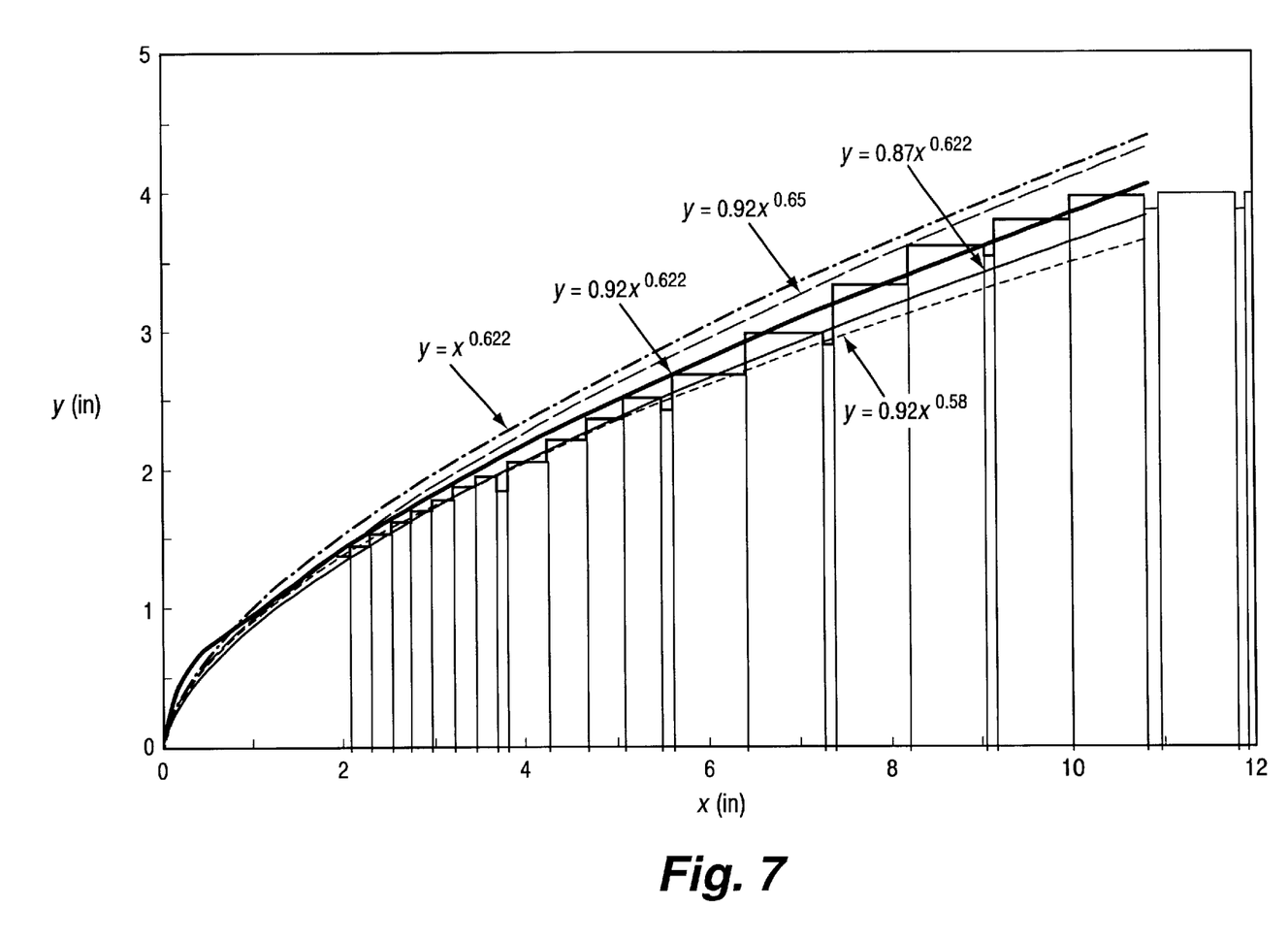
FIG. 7 illustrates the core end taper profiles in accordance with the invention, arrived at by mathematical calculation.

The stator core-end taper is constructed of silicon-iron laminates. FIG. 5 shows part of the conventional core-end taper 34 (from FIG. 1). The profile generated by the individual lamination is rough and uneven, particularly as the core transitions from surface regions 60 to 62 to 64, resulting in a large drag force to the ventilating flow. By contrast, the redesigned core-end taper 66 for a stator core 68 shown in FIG. 6 presents much smoother profile along the surface region. Specifically, and with reference to FIG. 7, the new core-end taper profile can be mathematically correlated using an exponential function:

$$y = mx^n$$

where m and n are constants, confined in the ranges $0.87 \leq m \leq 1.0$ $0.58 \leq n \leq 0.65$ and where x is an axial length dimension of the core from the forward edge thereof and y is a radial height of the core-end taper.

In FIG. 7, the solid lines above and below the curve of $y = 0.92 x^{0.622}$ represent the upper and lower values of m, respectively. Similarly, the dotted lines represent the upper and lower values of n, respectively. It can be seen that for this specific example, the curve of $y = 0.92 x^{0.622}$ best fits the core-end taper profile.

Figure 8:
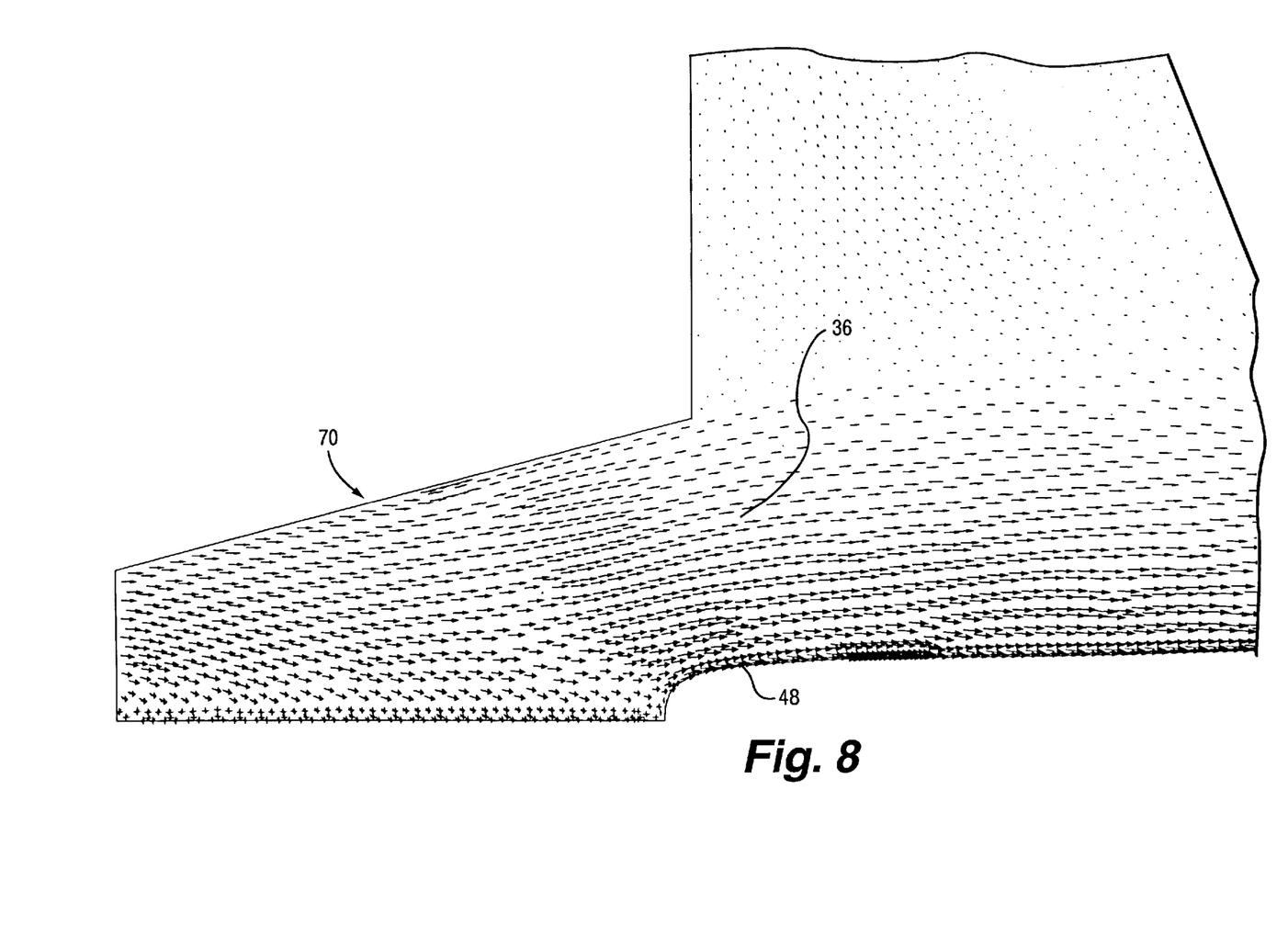
FIG. 8 is a flow diagram, illustrating velocity vectors at the air gap using the retaining ring and core end taper in accordance with the invention.

Turning to FIG. 8, the velocity vector diagram produced by the newly redesigned retaining ring and core-end taper indicates that the cooling gas now flows smoothly along the surface 48 of the retaining ring 46 with the spline profile as it passes the core-end taper 66 at the air gap exit 36. It should be noted that, for purposes of FIG. 8, smoothly curved surface region 70 of the core end taper 66 is represented by a straight line approximation of the curve. No flow recirculation can be observed at the front of the retaining ring. Hence, the drag force to the gas flow is reduced significantly. Numerical results have shown that with the new flow path, the pressure drop across the gap exit can be reduced by 53% as compared to the conventional design. Since each generator has two retaining rings, the total power saving must be doubled from the calculation.

In summary, the invention:

Reduces pressure drop and ventilation windage loss across the air gap exit in reverse flow generators;

Reduces the fan power required for generator/cooling ventilation;

Optimizes the flow path near the air gap exit;

Increases generator cooling capability and temperature uniformity; and

Improves cooling flow fluidity at the rotor-stator gap exit.

With the redesigned ventilating flow path, more than fifty percent of the pressure drop across the gap exit can be reduced, enhancing the overall generator performing efficiency by about 0.005%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stator core for a stator assembly, said core comprising of an annular body having a plurality of stator bars secured therein, and wherein axially opposite ends of said core are formed with a core-end taper that approximates a smooth curve to thereby reduce fluid flow drag across said core-end taper.

2. A stator core for a stator assembly, said core comprising of an annular body having a plurality of stator bars secured therein, and wherein axially opposite ends of said core are formed with a core-end taper that approximates a smooth curve wherein said core-end taper can be defined by the function $y=mx^n$ where m and n are constants within the ranges $$0.87 \leq m \leq 1.0$$

$$0.58 \leq n \leq 0.65$$

and wherein x is an axial length dimension of the core from a forward edge thereof, and y is a radial height of said core-end taper.

3. The stator core of claim 2 wherein m=0.92 and n=0.622.

4. A rotor assembly including a rotor body and a stator, said rotor body having field coils seated within radial slots formed in the rotor body with end turns of said coils extending beyond opposite ends of said rotor body, and annular retaining rings fixed to the opposite ends of the rotor body and adapted to constrain said end turns against centrifugal forces, and wherein said stator includes a core with stator bars secured therein, said core having core-end tapers at opposite ends thereof that define, in combination with said retaining rings, annular ventilation air exit gaps; each said retaining ring comprising axially inboard and outboard ends, and wherein a radially outer surface at said axially inboard end has an aerodynamically smooth spline shape defined by compound radii that merges into a rounded nose portion, said core-end tapers of said stator core tapering in an axial and radially outward direction in a manner approximating a smooth curve.

5. The rotor assembly of claim 4 wherein said aerodynamically smooth spline shape extends about 17% of a length dimension of said retaining ring, measured from said rounded nose portion.

6. The rotor assembly of claim 4 wherein said smooth curve is defined by the function $y=mx^n$ where m and n are constants within the ranges $$0.87 \leq m \leq 1.0$$

$$0.58 \leq n \leq 0.65$$

and wherein x is an axial length dimension of the core from a forward edge thereof, and y is a radial height of said core-end taper.

7. The rotor assembly of claim 6 wherein m=0.92 and x=0.622.

8. The retaining ring of claim 4 wherein said aerodynamically smooth spline shape is described by a function of the cubic curve $$y = \frac{x}{a+bx+cx^2}$$

where a, b, and c are constants.

9. The rotor assembly of claim 8 wherein a is in a range of less than or equal to 5 and greater than or equal to 0.2; b is in a range of less than or equal to 2.5 and greater than or equal to 1.5; and c is in a range of less than or equal to 0 and greater than or equal to −0.005.

10. The rotor assembly of claim 9 wherein said taper is determined by the function $y=mx^n$ where m and n are constants within the ranges $$0.87 \leq m \leq 1.0$$

$$0.58 \leq n \leq 0.65$$

and wherein x is an axial length dimension of the core from a forward edge thereof, and y is a radial height of said core-end taper.

11. The rotor assembly of claim 10 wherein m=0.92 and x=0.622.

12. The rotor assembly of claim 8 wherein said smooth curve is defined by the function $y=mx^n$ where m and n are constants within the ranges $$0.87 \leq m \leq 1.0$$

$$0.58 \leq m \leq 0.65$$

and wherein x is an axial length dimension of the core from a forward edge thereof, and y is a radial height of said core-end taper.

13. The rotor assembly of claim 12 wherein m=0.92 and x=0.622.

* * * * *

UNITED STATES PATENT AND TRADEMARK OFFICE
CERTIFICATE OF CORRECTION

PATENT NO.     : 6,346,755 B1
DATED          : February 12, 2002
INVENTOR(S)    : Tong et al.

It is certified that error appears in the above-identified patent and that said Letters Patent is hereby corrected as shown below:

Column 1,
Line 41, delete "$WO_{loss}$" and insert -- $W_{loss}$ --.

Column 3,
Line 11, delete "19" and insert -- 38 --.

Column 4,
Lines 11-15, delete the existing lines and insert therefor:
-- $0.2 \leq a \leq 5.0$
$1.5 \leq b \leq 2.5$
$-0.005 \leq c \leq 0$ --
Line 42, delete the existing lines and insert therefor:
-- $0.87 \leq m \leq 1.0$
$0.58 \leq n \leq 0.65$ --

Column 5,
Lines 38-40, delete the existing lines and insert therefor:
-- $0.87 \leq m \leq 1.0$
$0.58 \leq n \leq 0.65$ --

Column 6,
Lines 11-14, delete the existing lines and insert therefor:
-- $0.87 \leq m \leq 1.0$
$0.58 \leq n \leq 0.65$ --
Lines 38-40, delete the existing lines and insert therefor:
-- $0.87 \leq m \leq 1.0$
$0.58 \leq m \leq 0.65$ --

UNITED STATES PATENT AND TRADEMARK OFFICE
CERTIFICATE OF CORRECTION

PATENT NO. : 6,346,755 B1
DATED : February 12, 2002
INVENTOR(S) : Tong et al.

It is certified that error appears in the above-identified patent and that said Letters Patent is hereby corrected as shown below:

<u>Column 12,</u>
Lines 51-53, delete the existing lines and insert therefor:
-- $0.87 \leq m \leq 1.0$
$0.58 \leq m \leq 0.65$ --

Signed and Sealed this

Ninth Day of July, 2002

*Attest:*

JAMES E. ROGAN
*Attesting Officer*   *Director of the United States Patent and Trademark Office*